United States Patent [19]

Vasquez

[11] Patent Number: 4,616,111

[45] Date of Patent: Oct. 7, 1986

[54] REMOTE CONTROLLED KEY DISPENSING APPARATUS

[76] Inventor: Tulio Vasquez, Carrera 15 - N° 39-27, Bogota, Colombia

[21] Appl. No.: 597,654

[22] Filed: Mar. 30, 1984

[51] Int. Cl.[4] .......... H04M 11/00

[52] U.S. Cl. .......... 179/2 A; 340/825.31; 340/301; 221/153; 221/12

[58] Field of Search .......... 179/2 A, 2 AM; 221/9, 221/12, 281, 153, 239, 258; 340/825.06, 825.07, 825.31, 825.34, 301; 194/37, 40, 79, 91; 361/171, 172

[56] References Cited

U.S. PATENT DOCUMENTS

| | | | |
|---|---|---|---|
| 2,811,583 | 10/1957 | Timms et al. | 179/2 A |
| 3,780,907 | 12/1973 | Colburn et al. | 179/2 A X |
| 3,937,925 | 2/1976 | Boothroyd | 340/825.35 X |
| 4,010,868 | 3/1977 | Rese et al. | 221/9 |

*Primary Examiner*—James L. Dwyer
*Assistant Examiner*—W. J. Brady
*Attorney, Agent, or Firm*—Browdy and Neimark

[57] ABSTRACT

One or more security receptacles, provided for safe-keeping keys, include a deposit opening especially configured in a shape corresponding to the longitudinal cross-section of the key handle. A set of ramps oblique and a normally locked horizontal ramp in the receptacle prevent access to the key. The horizontal ramp may be released from its horizontal position by disabling the lock so that the key falls to a lower portion of the receptacle. Disabling of the lock is accomplished by transmitting a coded signal to a receiver incorporated in the lock. Access to the key is then possible, preferably requiring a second key to open the lower portion of the receptacle.

14 Claims, 3 Drawing Figures

REMOTE CONTROLLED KEY DISPENSING APPARATUS

BACKGROUND OF THE PRESENT INVENTION

The present invention relates to apparatus for opening access doors to security vaults, safes and other security sites and areas of an establishment controlled from a remote location.

More specifically, the invention makes possible remote control dispensing of keys of the sites under control, by using currently existing telephone links between the controlled, and control, location in cooperation with electronic, electric and mechanical devices. The invention contemplates a variety of uses; one is the control, from the main office of a bank, of all the branches in a city, a country or the world, to dispense at the site of use keys necessary to gain access to key security sites.

The invention comprises a security receptacle or group of receptacles suitable for safekeeping of the keys that are deposited in a way similar to depositing of coins in a box. Each key has a specially shaped handle so that each key can be introduced only in the corresponding receptacle. When introduced, it passes to the middle of the receptacle by a set of upper ramps and is held there by a horizontal gate that is locked.

For example, at a controlled location, the opening of a security vault might require the key which has been deposited in a receptacle. An employee at the controlled location by a specific telephone calls the control location. After providing satisfactory oral identification, the caller sends an electronic signal, for example, a code activated by a key selector switch, which is displayed digitally on a panel by the controller. The controller, after verifying the code sent, in turn digitally sends a code which is transmitted, in the preferred embodiment of the invention, by tones on a high audio scale.

Each of the telephones is connected to the line by a low-pass filter which causes the tones used not to be heard on either of the two telephones, thus keeping them from being taped.

A decoder, located on the telephone line, at the controlled location interprets the signal and sends a pulse to the opening system of the receptacle that contains the key. The pulse energizes a first programable timer circuit of the corresponding receptacle, for example, for 15 minutes, at the end of which it will in turn send a pulse to a solenoid that releases a ramp which, by a system of stationary security ramps, allows the corresponding key to drop.

To remove the key, yet another key, available at the controlled location, is required to open a gate located in the lower part of the receptacle.

DETAILED DESCRIPTION OF THE INVENTION

Figure 2:
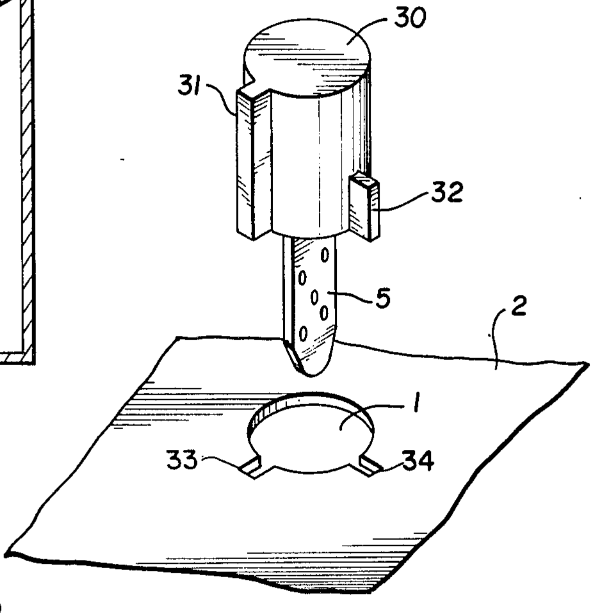
FIG. 2 illustrates a preferred embodiment of a key inserted in a corresponding handle positioned for penetrating the corresponding opening of its receptacle.

As shown in FIG. 2, control key 5, is inserted in a handle 30, bearing circumferentially spaced projecting guide element 31 and projecting key element 32, the latter guide and key elements insuring that each control key will fit only in a corresponding receptacle. As also shown in FIG. 2, control key 5 is introduced into its corresponding receptacle through opening 1 which has slots 33 and 34 corresponding to the guide and key elements.

Upon introduction into the receptacle at the controlled location, key 5 falls, via a set of ramps with holes 3, onto gate 4 which is held in locked position by the action of a weak tension spring 5. Gate 4 remains locked by the action of a wedge-shaped catch 6. The holes in the ramp are intended to catch and deflect wires with which an illegal attempt is made to extract key 5.

Gate 4 is pivotably supported by hinge 12, and the spring 11 keeps gate 4 in locked position. The weight of key 5 and handle 30 is normally sufficient to overcome the force of spring 11, but gate 4 is maintained in locked position by catch 6 without which keys would fall, by ramps 13, to lower receptacle 14.

When key 5 is on ramp 4, it may be removed from receptacle 2 only when catch 6 is moved out of supporting engagement with the free end of gate 4. Catch 6 is shown to be integrally formed with the core of solenoid 8, and is retractable out of supporting engagement by the coil of solenoid 8.

Catch 6 is projected by projection 7 of gate 4 to keep it from being shoved out of its supporting engagement position from the lower part of receptacle 14.

Figure 1:
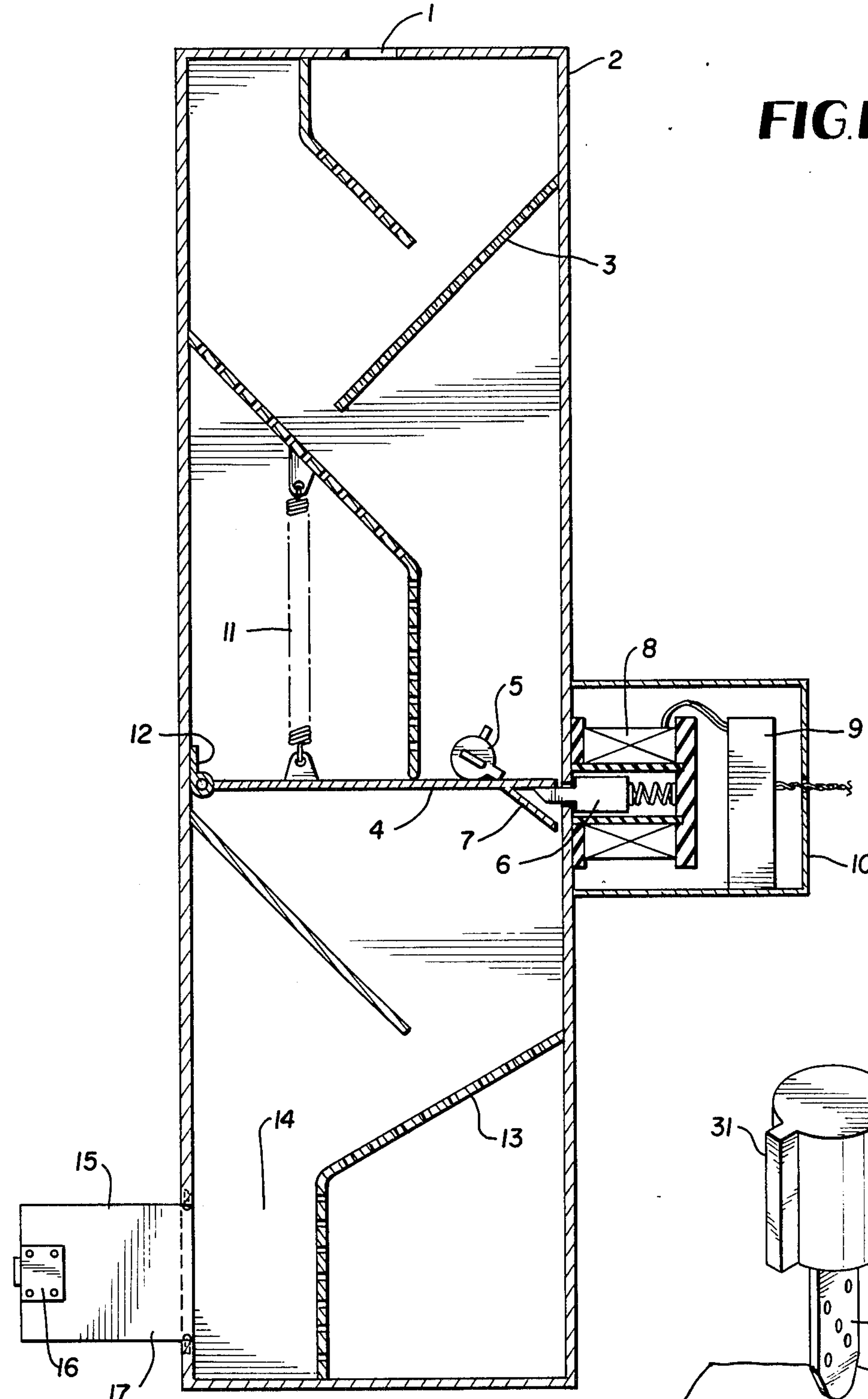
FIG. 1 shows a side view, in section, of the receptacle, showing the front gate in an open position.

When solenoid 8 is energized, it forcefully attracts catch 6 (the latter being retracted to the right in FIG. 1), releasing gate 4 downward thus permitting key 5 inserted in handle 30 to overcome the force of spring 11 and by its own weight, drop onto ramp 13 and then to lower receptacle 14, from which it can be extracted when lock 16 of door 17 is opened.

Block 9 represents the electronic circuits that energize solenoid 8, a unit that is protected from manipulation from the outside by case 10.

Figure 3:
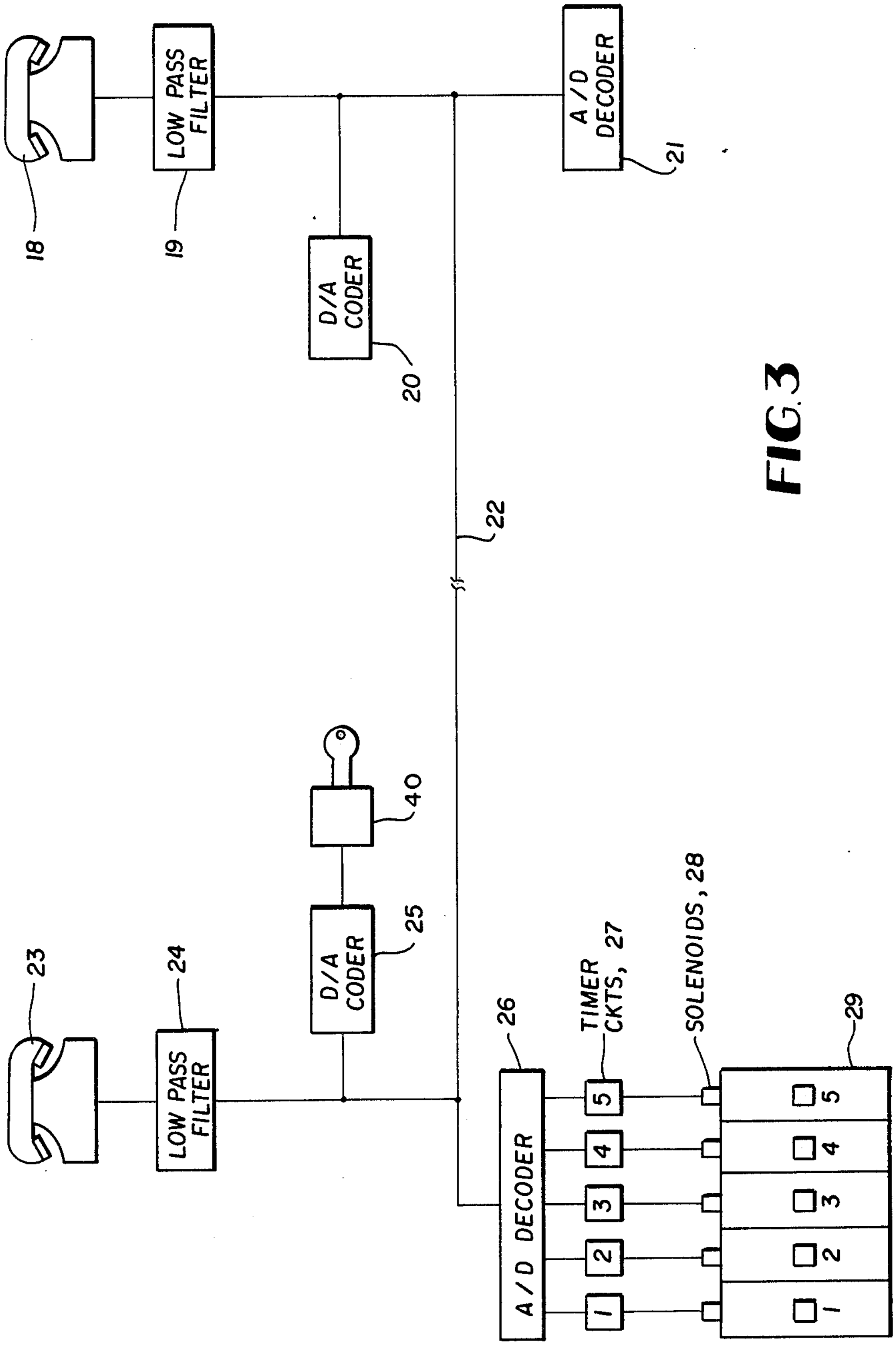
FIG. 3 is a block diagram of an electric and electronic circuit embodied by the present invention.

Looking now at FIG. 3, when at the controlled location, it is desirable to retrieve one of the keys deposited in the group of receptacles 29, for example, the key contained in receptacle 2, a person using telephone 23 at the controlled location to dial the number corresponding to telephone 18 located at the control location to establish communication with the controller, and to identify himself, will send a code by activating key selector 40 which acts on digital-analog coder 25 to send a train of high tones by telephone line 22. This train of tones is not heard on telephone 23 or telephone 18 located at the control location due to low-pass filters 24 and 19, respectively, corresponding to telephones 23 and 18 which allow the voice frequencies of the conversation to pass but considerably attentuate the tones used in the control operations.

The train of tones sent by coder 25 is received by analog-digital decoder 21, allowing the controller to verify the exact and correct origin of the call. Depending on the positioning of the key selector 40, in addition to the site identification code, various other codes corresponding to various types of emergencies can be sent, all these codes appearing on the display of decoder 21.

The controller releases the desired key by digitizing, via a keyboard, the corresponding code. The digital-analog coder then sends a train of tones which is interpreted by analog-digital decoder 26 and which sends a pulse to one of the timer circuits 27, in this example timer circuit 2. The timer circuit is energized and constitutes a time barrier to energization of one of solenoids 28. After a delay, for example 15 minutes, key number 2 is released. Each of the timer circuits 27 can be set for a different timing.

In addition to opening the receptacles from the remote or control location, it is also possible to effect the opening of the receptacles at the controlled location by means of a key-operated switch associated with each receptacle and a major key which cooperates with any one(s) of the key switches to thereby open the receptacles. This embodiment would be particularly interesting, for example for vaults in small towns in which it would not be feasible to have a telephone link to a remote location. In such a case, actuation of a receptacle key switch corresponds with, and results in, actuation of the timer circuit associated with that receptacle. Thus upon actuation of the key switch, for example, for receptacle no. 2 in FIG. 3, time circuit no. 2 associated with that receptacle will be actuated to thereby cause the opening of the receptacle to be delayed by the preselected amount of time. If two or more receptacles are to be opened, at the side of the receptacles (the contolled location) using the master key, the user must separately actuate each of the key switches for each of the respective receptacles. Then the delay of time until the two or more receptacles open will be the sum of the time delays of the receptacles involved.

It is understood that a man skilled in the art will be able to make various changes and substitutions without modifying the scope of the invention. Various classes and sources of information different from voice can be used, including pulses and tones generated by the telephones themselves.

By using systems of selection by weight and shape, similar to those used for coin-operated machines, it is possible to determine automatically the presence of the corresponding keys in each receptacle and to use this information to activate an AND signal that could be examined at the control location by a circuit for automatic reply and sending of a suitable signal automatically from the controlled location.

Instead of keys, various items could be dispensed, including the repetitive dispensing of objects of the same type or kind in a timed or untimed manner.

Instead of telephone lines any telecommunications system can be used.

What is claimed is:

1. Dispensing apparatus at a first location for selectively dispensing keys, comprising:

a plurality of key storage devices, each having an upper portion and a lower portion, for holding said keys, the upper portion of each said key storage device including apertured means, consisting of slotted portions configured to permit only one of said keys to be passed therethrough, for introducing each said one key into said storage device upper portion, means supported within each said key storage device for blocking travel of a respectively introduced key from said upper portion to said lower portion;

electronically actuated means for releasing said blocking means from a travel blocking position; and means, at a location remote from said first location, for actuating selected releasing means.

2. The dispensing apparatus of claim 1 wherein said blocking means comprises gate means pivotally mounted between the lower portion and the upper portion of said key storage device, said gate means normally in a position separating said upper portion from said lower portion, and said releasing means comprising a retractable catch normally projecting through a side of said key storage device into engagement with said gate means for supporting said gate means in its separating position, and means for retracting said catch from its normally projecting position.

3. The dispensing apparatus of claim 2 wherein said retracting means comprises a solenoid electrically coupled with said releasing means.

4. The dispensing apparatus of claim 2 wherein said key storage device upper portion includes a support, and tensioned biasing means having one end attached to said support and an opposite end attached to said gate means, said biasing means normally supporting said gate means in its separating position, whereby when said catch is retracted, said one key resting on said gate means overcomes the tension of said biasing means and causes said gate means to pivot to an unblocking position so that said one key passes from said upper portion to said lower portion.

5. The dispensing apparatus of claim 4 and further comprising means for accessing said one key when it passes to said lower portion.

6. The dispensing apparatus of claim 1 wherein said releasing means and said actuating means comprise a system for generation and transmission of coded electrical control signals.

7. The dispensing apparatus of claim 6 wherein said control signals are controlled by a selector.

8. The dispensing apparatus of claim 1 wherein said actuating means comprises means for generating a coded signal and said releasing means comprises means for decoding the signal generated by said actuating means.

9. The dispensing apparatus of claim 8 wherein said releasing means comprises an opening circuit including a timer operatively coupled with said blocking means.

10. The dispensing apparatus of claim 9 wherein said opening circuit is actuated by said coded signal.

11. The dispensing apparatus of claim 9 wherein said opening circuit is actuated by the signal of said decoding means.

12. The dispensing apparatus of claim 3 wherein said releasing means comprises an opening circuit, including a timer operatively coupled with said blocking means.

13. The dispensing apparatus of claim 1, wherein each of said keys include a handle and portions projecting laterally from the handle, whereby each of said keys has a configuration which is unique from any other one of said keys, and said slotted portions of any one of said key storage device introducing means are arranged to correspond with only a respective one of said keys.

14. A system for storing and selectively dispensing keys, at a security facility at a first location, to an identifiable user at the first location from a remote second location, comprising:

a plurality of key storage devices at said first location, each said storage device having an upper portion, and a lower portion, for holding only one of said keys, the upper portion of each said key storage device including an aperture, having slotted portions, each aperture having a configuration corresponding with only said one of said keys, said aperture defining means for introducing each said one key into a respective one of said storage device upper portions;

means, supported within each said key storage device, for selectively blocking travel of an introduced key from said upper portion to said lower portion;

means, at said first location, for generating a first set of user-generated coded electrical signals, whereby said user identifies himself;

means, at a location remote from said first location, for receiving said first set of signals, said receiving means including means for decoding said first set of signals, whereby the identity of said user may be verified;

means, at said remote location, for generating a second set of coded electrical signals upon verification of the identity of said user;

means, interconnecting said first and second locations, for transmitting said first set of signals to said remote location and said second set of signals to said first location; and means, associated with an appropriate one of each of said key storage devices and actuatable by said second set of coded electrical signals, for releasing the respective blocking means of said one key storage device from a travel blocking position, whereby after a user has transmitted the first set of coded signals to said remote location, said second set of signals is transmitted to said first location only after identification of said user is verified.

* * * * *